United States Patent [19]
Kudo

[11] Patent Number: 6,071,605
[45] Date of Patent: Jun. 6, 2000

[54] MAGNETIC RECORDING MEDIUM AND PRODUCTION METHOD THEREOF

[75] Inventor: Takao Kudo, Miyagi, Japan

[73] Assignee: Sony Corporation, Tokyo, Japan

[21] Appl. No.: 09/098,428

[22] Filed: Jun. 17, 1998

[30] Foreign Application Priority Data

Jun. 17, 1997 [JP] Japan .................................. 9-160209

[51] Int. Cl.⁷ .............................. G11B 5/738; G11B 5/702
[52] U.S. Cl. .................. 428/323; 428/522; 428/694 BN; 428/694 BS; 428/694 BG; 428/900
[58] Field of Search ..................................... 428/323, 403, 428/694 BN, 694 BS, 694 BG, 522, 900

[56] References Cited

U.S. PATENT DOCUMENTS

5,702,757  12/1997  Ohmura ................................. 427/131
5,922,454   7/1999  Inaba et al. ............................ 428/328

*Primary Examiner*—Stevan A. Resan
*Attorney, Agent, or Firm*—Hill & Simpson

[57] ABSTRACT

The present invention provides a magnetic recording medium including a lower non-magnetic layer mainly consisting of a non-magnetic powder and a binder and an upper magnetic layer mainly consisting of a magnetic powder and a binder which layers are formed on a non-magnetic support body, wherein the binder of the lower non-magnetic layer is a vinyl chloride copolymer having a sulfonic acid base and/or a quaternary ammonium base and hydroxy group and epoxy group, and having an average polymerization degree of 100 to 220, and the non-magnetic powder is a non-magnetic powder having a longer axis length of 0.2 $\mu$m or below and an acid surface.

4 Claims, 2 Drawing Sheets

MAGNETIC RECORDING MEDIUM AND PRODUCTION METHOD THEREOF

BACKGROUND OF THE INVENTION

1. Field of the Invention

The present invention relates to a magnetic recording medium such as a magnetic tape and a magnetic disc and in particular to a magnetic recording medium produced by way of layered painting and a production method thereof.

2. Description of Prior Art

Conventionally, as a video tape, audio tape, magnetic disc, and the like, a so-called paint type magnetic recording medium is widely used which is prepared by applying on a non-magnetic support body a magnetic paint prepared by dispersing in a binder a ferromagnetic powder such as a ferromagnetic iron oxide, Co-denatured iron oxide, $CrO_2$, and the like.

Recently, in the field of magnetic recording, there has been made a great advance in the recording density and wavelength shortening. The aforementioned paint-type magnetic recording medium should also have characteristics to answer such a recording density and short wavelength.

Here, as a method to improve the electromagnetic conversion characteristic in a high density recording region on the paint-type magnetoelectric medium, there can be exemplified reduction of the thickness of a magnetic layer. When the magnetic layer is made thin, it is possible to reduce the self demagnetization loss during a recording and a thickness loss during a reproduction, effectively improving the electromagnetic characteristic.

However, if the thickness of the magnetic layer is made as thin as 2 $\mu$m or below, for example, the surface configuration of a non-magnetic support body easily appears on the surface of the magnetic layer, deteriorating the surface of the magnetic layer.

To cope with this, there has been proposed a double paint type configuration of magnetic recording medium in which a lower non-magnetic layer having a comparatively large thickness is provided between the magnetic layer and the non-magnetic support body, so that the surface configuration of the non-magnetic support body cannot clearly appear on the surface of the magnetic layer. In this double paint type magnetic recording medium, it is possible to form a thin magnetic layer with a flat and smooth surface, which in turn enables to obtain an excellent electromagnetic conversion characteristic in the short wavelength region.

However, in this double paint type magnetic recording medium, there is still a problem to improve the composition and preparation method of the lower pain.

For example, in this double paint type magnetic recording medium, although it is possible to obscure the surface configuration of the non-magnetic support body appearing on the magnetic layer surface, the smoothness of the magnetic layer surface may be deteriorated depending on the preparation method of the lower non-magnetic paint. For this, in order to obtain a smooth magnetic layer surface, the composition and preparation conditions of the lower non-magnetic paint become very import but there has not been found an appropriate composition or preparation condition for this.

Moreover, in such a pint-type magnetic recording medium, in order to assure the tape running efficiency, a fatty acid lubricant is added to a magnetic paint but it is impossible to contain a sufficient amount of lubricant in the magnetic layer because the magnetic layer has a small thickness. For this, a method often used adds a fatty acid lubricant to the lower non-magnetic layer as well, so that the magnetic layer and the magnetic layer surface contain a sufficient lubricant. However, if a fatty acid is added to the lower non-magnetic layer, the fatty acid added firmly adheres to the non-magnetic powder surface and cannot exhibit a sufficiently lubrication in the magnetic layer and the magnetic layer surface as is expected. Moreover, in the double paint type magnetic recording medium, there can be seen a phenomenon that the lubricant added to the magnetic layer is pulled into the lower non-magnetic powder, making it difficult to assure the tape running durability.

SUMMARY OF THE INVENTION

It is therefore and object of the present invention to provide a magnetic recording medium which is formed so as to have an excellent running durability with a preferable surface, a preferable lubrication which is maintained for a long time, an excellent electromagnetic conversion characteristic, and a preferable RF envelope configuration as well as to suppress a drop out; and a production method of such a magnetic recording medium with a high yield.

In order to achieve the aforementioned object, the inventors of the present invention studied materials to be used and found that the non-magnetic powder used for the lower non-magnetic layer should have a particular particle size and a chemical characteristic of the surface and that the binder should be a particular type. The present invention has been developed based on these facts.

That is, the magnetic recording medium according to the present invention is a double-layered paint type magnetic recording medium including the lower non-magnetic layer containing as the binder a vinyl chloride copolymer having a sulfonic acid base and/or quaternary ammonium base and hydroxy group and epoxy group, and having an average polymerization degree of 100 to 220; and as the non-magnetic powder a non-magnetic powder having a longer axis length of 0.2 $\mu$m or below and an acid surface.

Moreover, the magnetic recording medium production method according to the present invention forms a lower non-magnetic layer by coating a non-magnetic support body with a lower layer non-magnetic paint containing a non-magnetic powder and a binder dispersed in a solvent, and coating the lower non-magnetic layer with an upper magnetic layer formed by applying an upper layer magnetic paint containing a magnetic powder and a binder dispersed in a solvent, wherein the lower layer non-magnetic paint is prepared by kneading a non-magnetic powder having a longer axis length of 0.2 $\mu$m and an acid surface together with a vinyl chloride copolymer having a sulfonic acid base and/or quaternary ammonium base and hydroxy group and epoxy group, with an average polymerization degree of 100 to 220 as well as a solvent, after which kneading a solvent is added to the mixture obtained, so as to be diluted and dispersed.

When the non-magnetic powder contained in the lower non-magnetic layer has an acid surface, a lubricant added to the lower non-magnetic paint and the upper magnetic paint can easily move to the surface of the upper magnetic layer, while suppressing adhesion of the lubricant to the non-magnetic powder. Consequently, the lubricant can effectively provides lubrication to the medium surface, which improves the running efficiency.

Moreover, when the non-magnetic powder has a longer axis length of 0.2 $\mu$m or below, the lower non-magnetic layer can be formed with a flat and smooth surface, which in turn enables to form the upper magnetic layer with a flat and smooth surface. As a result, it is possible to improve the electromagnetic conversion characteristic of the magnetic recording medium.

Furthermore, when the binder of the lower non-magnetic paint is a vinyl chloride copolymer having a predetermined functional group and polymerization degree of 100 to 220, it is possible to effectively disperse the non-magnetic power and to obtain a paint with an appropriate viscosity. Consequently, the lower non-magnetic layer can be formed with a flat and smooth surface, which in turn enables to form the upper magnetic layer with a flat and smooth surface. Moreover, usually, in the case when a vinyl chloride copolymer is used there is a problem of corrosion of a magnetic layer caused by hydrochloric acid generated by dehydrochlorination of the copolymer. However, in the vinyl chloride copolymer used here contains a epoxy group, which is capable of suppressing dehydrochlorination and preventing generation of corrosion in the magnetic layer.

DETAILED DESCRIPTION OF PREFERRED EMBODIMENTS

Hereinafter, description will be directed to embodiments of the present invention with reference to the attached drawings.

Figure 1:
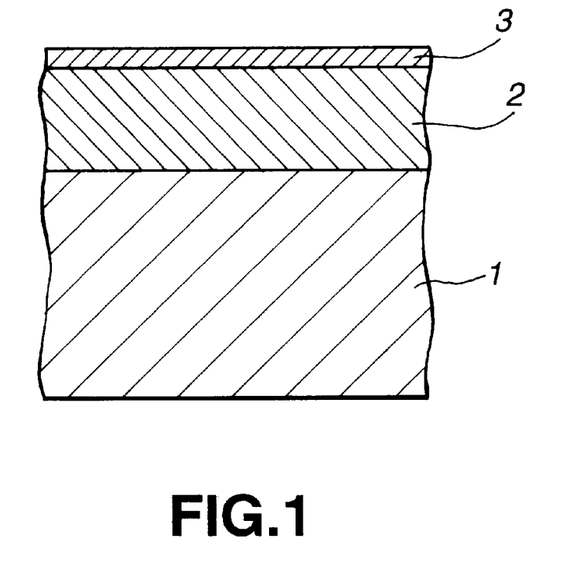
FIG. 1 is a cross sectional view showing an essential portion of a configuration example of a magnetic recording medium according to the present invention.

FIG. 1 shows a magnetic recording medium according to the present invention which is a so-called double paint type magnetic recording medium including a non-magnetic support body 1 which is covered by a lower paint film (lower non-magnetic layer) 2 containing a non-magnetic powder and a binder as main contents, which in turn is covered by an upper paint film (upper magnetic layer) 3 containing a magnetic powder and a binder as main contents. In this double paint type magnetic recording medium, the two layers of pain film 2 and 3 are formed successively as follows. A non-magnetic paint prepared by kneading and dispersing a non-magnetic powder and a binder in a solvent is applied to form a lower non-magnetic film and after this, on this lower non-magnetic paint film is formed an upper magnetic layer formed by applying a magnetic paint prepared by kneading and dispersing a magnetic powder and a binder in a solvent.

The aforementioned magnetic recording medium according to the present invention uses as a non-magnetic powder for the non-magnetic paint film a non-magnetic powder having a longer axis length of 0.2 μm or below and an acid surface; and as a binder, sulfonic acid base and/or quaternary ammonium base and hydroxyl group and vinyl chloride copolymer having an epoxy group and an average polymerization degree of 100 to 220.

Firstly, when the non-magnetic powder contained in the lower non-magnetic layer has an acid surface, a lubricant added to the lower non-magnetic layer and the upper magnetic layer will not adhere to the non-magnetic powder in a large amount and can easily move to the surface of the upper magnetic layer. Consequently, the lubricant can effectively exhibit lubrication on the medium surface, thus improving the running efficiency.

Moreover, when the non-magnetic powder has a longer axis length of 0.2 μm or below, the lower non-magnetic layer can be formed with a flat and smooth surface, which in turn enables to obtain the upper magnetic layer with a flat and smooth surface. As a result, the electromagnetic characteristic of the magnetic recording medium can also be improved.

Here the pH of the non-magnetic powder surface is determined by a boiling method. That is, a non-magnetic powder sample is added by a pure water so as to be suspended, and boiled. The pH of the obtained supernatant liquid is determined. This pH measurement uses a pH measurement apparatus of a glass electrode type.

As the non-magnetic powder, it is preferable to use a carbon black and an inorganic powder such as $TiO_2$, $\alpha\text{-}Fe_2O_3$, $\alpha\text{-}FeOOH$, and the like. Among these materials, the $\alpha\text{-}Fe_2O_3$ is the most preferable. These non-magnetic powders can be used as they are if they are acid themselves. Otherwise, a surface treatment can be carried out to adjust the pH. As the pH adjustment, there can be exemplified a method for adhering an element to the powder surface and a method for adjusting conditions of washing. In the former method for adhering an element to the powder surface, for example, adherence of Al changes the pH to alkaline side and adherence of Si changes the pH to acid side. Consequently, by adjusting the adherence quantity, if is possible to adjust the non-magnetic powder surface to a desired acid side pH value.

The non-magnetic powder preferably has a needle configuration. By using a needle type non-magnetic powder, it is possible to improve the flatness and smoothness of the surface of the lower non-magnetic layer, which in turn enables to make flat and smooth the surface of the upper magnetic layer formed on the non-magnetic layer. Furthermore, in order to make flat and smooth the upper magnetic layer surface, the non-magnetic powder preferably has an axis ratio (longer axis diameter/shorter axis diameter) of 2 to 20, and more preferably 1 to 15, and still further preferably 5 to 10. The non-magnetic powder preferably has a specific surface of 10 to 240 $m^2/g$, and more preferably 20 to 150 $m^2/g$, and still further preferably 30 to 100 $m^2/g$.

The mixing ratio of the non-magnetic powder to be mixed into the lower non-magnetic layer with respect to all the contents contained in the non-magnetic layer is 50 to 99 weight %, and preferably 60 to 95 weight %, and still more preferably 70 to 95 weight %. When the mixing ratio of the non-magnetic powder is in this range, it is possible to obtain a preferable surface of the lower non-magnetic layer as well as the upper magnetic layer.

On the other hand, in the vinyl chloride copolymer used as a binder of the lower non-magnetic layer, the sulfonic acid base and quaternary ammonium base added serve to improve the dispensability of the non-magnetic powder.

The mixing ratio of the sulfonic acid base and the quaternary ammonium base is preferably 0.3 to 3.0 weighty %. If the content of these functional groups is below 0.3 weight %, the non-magnetic powder has a lower dispensability and the surface of the upper magnetic layer becomes rough, deteriorating the electromagnetic conversion characteristic. Moreover, if this content exceed 3.0 weight %, the vinyl chloride copolymer cannot be preferably dissolved in the solvent, disabling to preferably apply the pain.

It should be noted that the quaternary ammonium base also serves as a catalyst for the reaction between the hydroxyl group of the copolymer and the isocyanate added as a hardening agent. This catalyst function is sufficiently exhibited when the content of the quaternary ammonium base is 0.3 weight % or above.

The hydroxyl group is introduced to react with isocyante so as to form a bridging structure. The content of this hydroxyl group is preferably 0.1 to 1.5 weight %. If the content of hydroxyl group is below 0.1 weight %, the bridging cannot be obtained sufficiently and it becomes impossible to obtain a sufficient strength of the entire tape. Moreover, if the content of the hydroxyl group exceeds 1.5 weight %, the viscosity of the lower non-magnetic paint becomes too high, resulting in insufficient painting efficiency.

The epoxy group is introduced to suppress dehydrochlorination of the vinyl chloride copolymer and generation of rust in the magnetic paint film due to the hydrochloric acid from the vinyl chloride copolymer. The content of the epoxy group is preferably 1.0 to 10.0 weight %. If the content of the epoxy group is below 1.0 weight %, it is impossible to sufficiently suppress the dehydrochlorination of the vinyl chloride copolymer and rust may be generated in the magnetic layer. Moreover, if the content of epoxy group exceeds 10.0 weight %, the viscosity of the lower non-magnetic paint becomes too high, disabling to obtain a preferable coating efficiency.

Furthermore, the aforementioned vinyl chloride copolymer has an average polymerization degree regulated to a comparatively low value. In order to disperse a non-magnetic powder having a longer axis length of 0.2 $\mu$m or below, it is important that the vinyl chloride copolymer has such a small average polymerization degree. If the average polymerization degree of copolymer exceeds 220, the wettability weigh respect to the non-magnetic powder is deteriorated and it is impossible to sufficiently disperse the non-magnetic powder. Moreover, the viscosity is also increased, deteriorating the painting efficiency. However, if the average polymerization degree is below 100, it becomes impossible to obtain a sufficient strength even if a hardening agent is used together, which results in insufficient durability.

It should be noted that in this non-magnetic layer, the binder may be added by a hardening agent for forming the bridge structure. As this hardening agent, polyisocyanate and the like are used. As the polyisocyanate, there can be exemplified an aromatic polyisocyate such as an additional mass of trilene diisocyanate (TDI) with active hydrogen compound, and an aliphatic polyisocyanate as an additional math of hexamethylen diisocyanate (MMDI) with active hydrogen compound, and the like. These polyisocyanates preferably have an average molecular weight in the range of 100 to 3000.

Moreover, the lower non-magnetic layer may contain additives including a lubricant, charge preventive agent, and conductive fine powder.

As the lubricant, it is possible to use a fatty acid and a fatty acid ester solely or in combination. The fatty acid may be monobasic acid or dibasic acid, and the number of carbons is preferably 6 to 30 and more preferably 12 to 22.

The mixing ratio of these fatty acid and fatty acid ester is preferably 0.2 to 10 weight % with respect to the non-magnetic powder, and more preferably 0.5 to 5 weight %. If the addition of the fatty acid is below 0.2 weight %, it is impossible to obtain a sufficient effect for improving the running efficiency. Moreover, if 10 weight % is exceeded, the fatty acid easily exudes out of the surface of the magnetic layer, causing output lowering. On the other hand, if the addition of the fatty acid ester is below 0.2 weight %, the still durability is insufficient. Moreover, if 10 weight % is exceeded, the fatty acid ester may exude out of the magnetic layer surface, causing output lowering. It should be noted that when the fatty acid and the fatty acid ester are used in combination, the mixing ratio is preferable 10:90 to 90:10 by weight %.

Moreover, it is also possible to use a known lubricant together with the aforementioned fatty acid and the fatty acid ester. As such a lubricant, there can be exemplified silicone oil, carbon fluoride, fatty acid amide, olefin oxide, and the like.

As the charge preventive agent, there can be exemplified cathion surface active agent such as quaternary amine; anion surface active agent containing an acid radical such as sulfonic acid, sulphuric acid, phosphoric acid, phosphoric acid ester, and carbonic acid; amphoteric surface active agent such as aminosulfonic acid; natural surface active agent such as saponin, and the like. The mixing ratio of these charge preventive agent is preferably in the range of 0.01 to 40 weight % with respect to the binder.

Besides, it is possible to add a conductive fine powder as the charge preventive agent. As the conductive fine powder, for example, it is possible to use carbon black, graphite, stannic oxide, silver powder, copper oxide, silver nitrate, organic compound of silver, copper powder, and other metal particles; and a pigment such as a metal oxide of zinc oxide, barium sulfate, titanium oxide, and the like which have been coated by a conductive material such as a stannic oxide film or antimony-solved stannic oxide film. There conductive fine powders preferably have an average particle diameter of 5 to 700 nm, and more preferably 5 to 200 nm. Moreover, the mixing ratio of these conductive fine powders is preferably 1 to 20 weight parts with respect to 100 weight parts of magnetic powder, and more preferably 2 to 7 weight parts.

The lower non-magnetic paint film made from the aforementioned materials is formed by kneading the non-magnetic powder and the aforementioned vinyl chloride copolymer together with various additives and a solvent, after which a solvent or binder are added as is necessary for dispersion so as to prepare the lower non-magnetic paint, which is applied to the non-magnetic support body.

Firstly, in the pain kneading process, the solvent may be any of those which are normally used in this type of magnetic recording medium. There can be exemplified acetone, methylethyl ketone, methylisobutyl ketone, cyclohexan and other ketones; methanol, ethanol, propanol, butanol and other alcohol; methyl acetate, ethyl acetate, butyl acetate, ethyl ethyl lactate, ethylene glycol acetate, and other esters; glycol dimethyl ether, glycol monoethyl ether, dioxan, tetrahydrofurane, and other ethers; benzene, toluene, xylene and aromatic hydrocarbon, methylene chloride, ethylene chloride, carbon tetrachloride, chloroform, dichlorobenzene, and other hydrocarbon halide. These solvents may be used solely or in combination.

Moreover, in this kneading process, it is possible to add a dispersing agent in order to preferably disperse the non-magnetic powder, As the dispersing agent, there can be exemplified fatty acid having 12 to 18 carbons, their alkali metal salts or alkali rare earth metal salts or their amide, polyalkylene oxide alkyl phosphate ester, lecithin, trialkyl polyolefinoxy quaternary ammonium salt, azo compound having a calboxyl group and a sulfonic acid group, and the like. It is preferable to use these dispersing agents in the range of 0.5 to 5 weight parts with respect to the non-magnetic powder.

For the kneading process, it is possible to use for example, two-roll mill, three-roll mill, ball mill, pebble mill, CoBall-Mill, tron mill, sand mill, sand grinder, Squegvari Attritor, high-speed impeller dispersing apparatus, high-speed stone mill, high-speed shock mill, disper, high-speed mixer, homogenizer, ultrasonic dispersing apparatus, open kneader, continuous kneader, pressurized kneader, and the like.

Among them, because it is possible to supply a consumption power load in the range of 0.05 to 0.5 kW (per 1 kg of powder), it is preferable to use the pressurized kneader, open kneader, continuous kneader, two-roll mill, are three-roll mill; and further preferable to use a continuous two-shaft kneader and continuous two-shaft kneader capable of dilution in multiple stages.

After the non-magnetic powder, binder, and solvent are kneaded, a binder and solvent are further added for dilution and dispersion.

The binder to be added may be the vinyl chloride copolymer kneaded in the kneading process or other binders. As the other binders, there can be exemplified, polyester resin, cellulose resin, polyurethane resin, vinyl chloride resin, vinyl chloride—vinyl acetate copolymer, vinyl chloride—vinyl acetate—vinyl alcohol copolymer, vinyl chloride—vinylidene chloride copolymer, acrylonitrile—butadiene copolymer, phenol resin, epoxy resin, polyamide resin, polyvinylbutylal, nitrocellulose, cellulose acetate butyrate, acryl resin, electron-ray hardening resin, and other organic high molecular compounds.

Moreover, as for the solvent, it is possible to use any of the solvents which have been exemplified for the kneading process.

On the other hand, the upper magnetic paint film is made from a ferromagnetic powder and a binder as main contents.

As the ferromagnetic powder, there can be exemplified $\gamma$-$Fe_2O_3$, $\gamma$-$Fe_2O_3$ containing Co, $\gamma$-$Fe_2O_3$ having Co adhered, $CrO_2$; and ferrite such as the magnetite, i.e., $Fe_3O_4$, $Fe_3O_4$ containing Co, $Fe_3O_4$ having Co adhered, and the like.

Among these ferrites, it is preferable to use as the ferromagnetic powder those which are plate-shaped and have a magnetization axis in the direction vertical to the plate. For example, hexagonal ferrite is the one.

As the hexagonal ferrite, there can be exemplified barium ferrite, strontium ferrite, and the like in which the iron element may be partially replaced by other element (such as Ti, Co, Zn, In, Mn, Ge, Nb, and the like). It should be noted that among the hexagonal ferrites, barium ferrite is especially preferable, and it is further preferable to use such a barium ferrite in which Fe is at least partially replaced by Co and Zn and which has an average particle diameter (diagonal line length of the plate plane of the hexagonal ferrite) of 300 to 900 Angstroms; plate ratio (the diagonal length divided by the thickness of the plate of the hexagonal ferrite) of 2.0 to 10.0; and coercive force in the range of 450 to 1500 Oe.

Moreover, as the ferromagnetic powder, it is possible to use a metal magnetic powder.

The metal magnetic powder may be a metal powder such as Fe and Co, or an alloy powder containing Fe, Ni, Co, or the like as the main contents such as Fe—Al, Fe—Al—Ni, Fe—Al—Zn, Fe—Al—Co, Fe—Al—Ca, Fe—Ni, Fe—Ni—Al, Fe—Ni—Co, Fe—Ni—Si—Al—Mn, Fe—Ni—Si—Al—Zn, Fe—Al—Si, Fe—Ni—Zn, Fe—Ni—Mn, Fe—Ni—Si, Fe—Mn—Zn, Fe—Co—Ni—P, Ni—Co, and the like.

Among these, Fe alloy magnetic powders have an excellent electric characteristic. Moreover, for the corrosion resistance and dispersion efficiency, the Fe—Al alloy powders are preferable such as Fe—Al, Fe—Al—Ca, Fe—Al—Ni, Fe—Al—Zn, Fe—Al—Co, Fe—Ni—Si—Al—Zn, and Fe—Ni—Si—Al—Mn.

Configuration of these metal magnetic powders is such that the average longer axis length is 0.5 $\mu$m or below, preferably 0.01 to 0.4 $\mu$m, and more preferably 0.01 to 0.3 $\mu$m; and the axis ratio (average longer axis length/average shorter axis length) is 12 or below, and preferably 10 or below.

Thus, as the ferromagnetic powder, it is possible to use an oxide magnetic powder and a metal magnetic powder, and in any of them, it is preferable that the saturation magnetization ($\sigma$s) be 70 emu/g or above. If the saturation magnetization is below 70 emu/g, it is impossible to obtain a sufficient electromagnetic conversion characteristic. Moreover, from the viewpoint of recording and reproduction in a high recording density area, it is preferable that the specific surface of BET be 45 $m^2$/g or above.

Next, as the binder, it is possible to use a polyurethane resin, polyester resin, vinyl chloride copolymer and other vinyl chloride resins. It should be noted that it is possible to use for the upper magnetic layer as well, a vinyl chloride copolymer having a sulfonic acid base and/or quaternary ammonium base and hydroxyl group and an epoxy group, and an average polymerization degree in the range of 100 to 220. This enables to preferably disperse power components in the upper magnetic layer, enabling to obtain a high coating strength.

Here, in the case when using other resins, the resins preferably contain a repetition unit having at least one polar group selected from a group consisting of —$SO_3M$, —$OSO_3M$, —COOM, —$PO(OM')_2$ (wherein M represents a hydrogen atom or an alkali metal such as Na, K, Li, and the like; M' represents a hydrogen atom or an alkali atom such as Na, K, Li, and the like, an alkyl group) and sulfobetaine. These polar groups serve to improve the dispensability of the ferromagnetic powder and is preferably contained in the range of 0.1 to 8.0 mol %, and more preferably 0.2 to 6.0 mol %. If the content of the polar group is below 0.1 mol %, the dispensability of the magnetic powder is lowered. On the contrary, if the content exceeds 8.0 mol %, the magnetic paint is easily gelatinized. Moreover, the resin average molecular weight is preferably in the range of 15,000 to 50,000.

It should be noted that the vinyl chloride copolymer having a polar group can be synthesized, for example, by way of addition reaction of a copolymer having a hydroxyl group such as vinyl chloride—vinyl alcohol copolymer with a compound having a polar group and chlorine atoms.

Moreover, polyester can be synthesized by reaction between a polyol and a polybasic acid. It should be noted that is possible to synthesize by a known method a polyester having other polar groups.

The polyurethane can be synthesized by a reaction between a polyol and polyisocyanate. The polyol normally used is polyester polyol obtained by reaction between a polyol and a polybasic acid. It should be noted that it is possible to synthesize a polyurethane having a polar group by using as the raw material a polyester polyol having a polar group.

Each of these resins can be used solely or in combination with other resins. For example, when using polyurethane and/or polyester together with vinyl chloride resin, the mixing ratio is preferably 90:10 and more preferably, 70:30 to 30:70.

Furthermore, it is possible to use the following resins in the range of 50 weight % of the entire binders.

As the resins to be used in combination, there can be exemplified those having an average molecular weight in the range of 10,000 to 200,000 such as vinyl chloride—vinyl acetate copolymer, vinyl chloride—vinylidene chloride copolymer, vinyl chloride—acrylonitrile copolymer, butadiene—acrylonitrile copolymer, polyamide resin, polyvinyl butylal, cellulose derivative (such as nitrocellulose), styrene—butadiene copolymer, phenol resin, epoxy resin, urea resin, melamine resin, phenoxy resin, silicone resin, acryl resin, ureaformamide resin, various synthetic rubber resin, and the like.

The mixing ratio of these binders into the upper magnetic layer is preferably in the range of 8 to 25 weight parts with respect to the 100 weight parts of the a ferromagnetic metal powder, and more preferably, 10 to 20 weight parts.

Moreover, in order to improve the medium running durability, the upper magnetic paint film normally may contain a abrasive, lubricant, durability improving agent, dispersing agent, charge preventive agent, conductive fine powder, and the like.

As the abrasive, there can be exemplified α-alumina, fused alumina, chrome oxide, titanium oxide, α-iron oxide, silicone oxide, silicone nitrate, tungsten carbide, molybdenum carbide, boron carbide, corundum, zinc oxide, cerium oxide, magnesium oxide, boron nitrate, and the like. The abrasive preferably has an average particle diameter in the range of 0.05 to 0.6 μm, and more preferably 0.05 to 0.5 μm, and still more preferably 0.05 to 0.3 μm. Moreover, the mixing ratio of this abrasive is in the range of 3 to 20 weight parts with respect to 100 weight parts of the magnetic powder, and more preferably 5 to 15 weight parts, and still more preferably 5 to 10 weight parts.

As the lubricant, dispersing agent, and charge preventive agent, it is possible to any of those indicated for the lower non-magnetic paint. The type and quantity of the additives added to the upper and the lower layers may be different or identical.

The upper layer paint film is formed by using the aforementioned materials. The magnetic powder, binders, and various additives are kneaded together with a solvent. After this, a solvent and if necessary a binder are added for dispersion, so as to prepare the upper layer paint, which is applied onto the lower layer paint film.

For the kneading and dispersion, it is possible to use any one of the solvents and kneading apparatuses which have been explained for preparation of the lower non-magnetic layer paint.

Moreover, as the material for the non-magnetic support body to which the aforementioned paint is applied, there can be exemplified polyethylene terephthalate, polyethylene-2, t-naphthalate and other polyesters, polypropylene and other polyolefins, cellulose triacetate, cellulose diacetate, and other cellulose derivatives, polyamide, aromatic polyamide resin, polycarbonate, and other plastics. These non-magnetic support bodies may be formed in a single layer configuration or in multiple-layered configuration. Moreover, for example, the non-magnetic support bodies may be subjected to a surface treatment such as Corona discharge processing.

The thickness of the non-magnetic support body is not limited to a particular value. For example, if the medium is a film shaped or sheet shaped, the thickness is preferably 2 to 100 μm, and more preferably, 3 to 50 μm. In a case when the medium has a disc shape or a card shape, the thickness is preferably in the range of 30 μm to 10 mm. In the case when the medium has a drum shape, the thickness may be selected according to the design of a recorder and the like.

Next, explanation will be given on specific methods for applying the lower paint and the upper paint.

Figure 2:
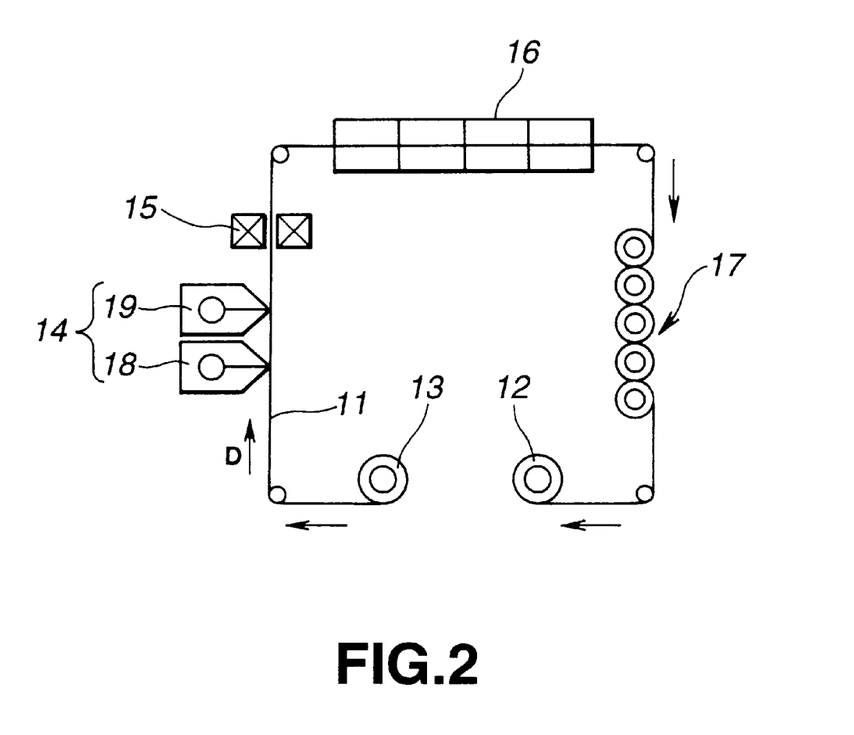
FIG. 2 schematically shows a paint film forming system for forming a lower non-magnetic layer and an upper magnetic layer by way of the wet-on-wet painting method.

When forming the upper magnetic layer and the lower non-magnetic layer, for example, a paint coating system as shown in FIG. 2 is used.

That is, in this paint coating system, a non-magnetic support medium 11 on which a film is to be formed is made to run from a supply roll 13 to a wind-up roll 12. Along this travel direction, there are provided a paint coating apparatus 14, an orientation magnet 15, a dryer 16, and a calendar apparatus 17 in this order.

In such a paint coating system, firstly, the paint coating apparatus 14 applies the upper magnetic paint and the lower non-magnetic paint onto the non-magnetic support body 11.

Figure 3:
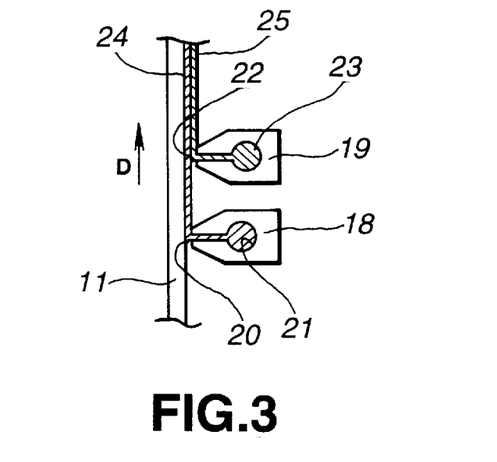
FIG. 3 schematically shows an example of a painting apparatus of the aforementioned paint film forming system.

As shown in FIG. 3, this paint coating apparatus 14 includes a lower pint extrusion coater 18 for applying the lower paint and an upper paint extrusion coater 19 for applying the lower paint which are arranged in such a manner that the upper paint extrusion coater 19 is provided at the send-out side of the non-magnetic support body 11 and the lower paint extrusion coater 18 is provided at the introduction side of the non-magnetic support body 11.

Each of the lower paint extrusion coater 18 and the upper paint extrusion coater 19 has at their ends a slit portion 20, 22 for extruding a pint. The slit portion 20, 22 is supplied with a paint from a pint port 21, 22 provided behind the slid portion. In the extrusion coaters 18 and 19 having such a configuration, a paint supplied to the paint port 21, 23 is extruded through the slit portion 20, 22 to the caoter tip portion.

On the other hand, the non-magnetic support body 11 to be coated with paints is made to travel in the direction of arrow D in the figure along the tip surface of the lower paint extrusion coater 18 and the tip surface of the upper paint extrusion coater 19 from the lower paint extrusion coater 18 to the upper paint extrusion coater 19.

The non-magnetic support body 11 thus traveling is firstly coated with the lower paint extruded from the slip portion 20 of the lower paint extrusion coater 18 so as to form a lower paint film 24 while passing by this lower paint extrusion coater 18, and then coated with the upper paint extruded from the slit portion 22 of the upper paint extrusion coater 19 so as to form a double-layered film 24, 25 while passing by this upper paint extrusion coater 19.

It should be noted that the paint supply to these coaters 18 and 19 may be carried out via an in-line mixer.

The lower non-magnetic layer 24 and the upper magnetic layer 25 thus formed then travel along the orientation magnet 15, the dryer 16, and the calendar apparatus 17.

The orientation magnet 15 carries out magnetic field orientation to the upper layer film. It should be noted that as the orientation magnet 15, it is possible to select a magnet for magnetization in the longitudinal direction or a magnet for magnetization in the vertical direction depending on the type of the magnetic powder contained in the upper magnetic film. The orientation magnet preferably has a magnetic field in the order of 20 to 10,000 Gauss.

While traveling in the dryer 16, the lower non-magnetic layer and the upper magnetic layer are dried by a heat stream from nozzles arranged at the top and bottom of the dryer 16. The drying conditions are preferably as follows: temperature in the range of 30 to 120° C. and the drying time in the order of about 0.1 to 10 minutes.

The lower non-magnetic layer and the upper magnetic layer after having passed the dryer 16 are introduced into the calendar apparatus 17 so as to be subjected to a surface smoothing process. In this surface smoothing process by this calendar apparatus 17, the temperature, the linear pressure, and the travel speed are important factors. That is, it is preferable that the temperature be in the range of 50 to 140° C., the linear pressure be in the range of 50 to 1000 kg/cm$^2$, and the travel speed be in the range of 20 to 1000 m/min. Unless these conditions are satisfied, the surface of the upper magnetic layer may be deteriorated.

Figure 4:
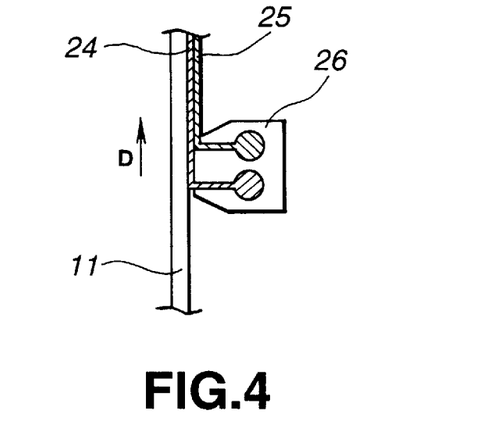
FIG. 4 schematically shows another example of the painting apparatus.

Note that in this paint coating system, the lower paint and the upper paint are applied respectively from separate two coaters. However, as shown in FIG. 4, it is also possible to use a single extrusion coater 26 in which the lower paint extrusion coater and the upper paint extrusion coater are formed in a unitary block.

Furthermore, instead of extrusion coaters, it is also possible to use a reverse roll, gravure roll, air doctor coater, blade coater, air knife coater, squeeze coater, impregnation coater, transfer roll coater, kiss coater, cast coater, spray coater, and the like. In this case, the lower paint and the upper paint may be applied by an identical application method or different application methods. Consequently, it is also possible to use the reverse roll and the extrusion coater in combination, or the gravure roll and the extrusion coater in combination, for application of the upper paint and the lower paint.

Moreover, in the aforementioned configuration, the lower non-magnetic paint and the upper magnetic paint are applied through slits which are provided separately from each other. However, it is also possible to use an extrusion coater having two slits provided adjacent to each other for simultaneously applying the lower non-magnetic paint and the upper magnetic paint.

Figure 5:
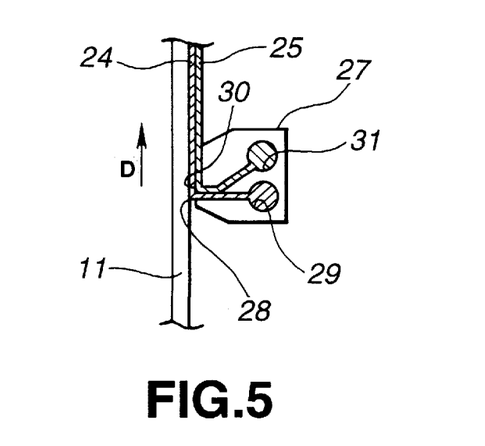
FIG. 5 schematically shows still another example of the painting apparatus.

That is, as shown in FIG. 5, an extrusion coater 27 used for simultaneous double paint coating has at its end portion two slit portions (i.e., a lower layer paint slit portion 28 and an upper layer paint slit portion 29) which are formed adjacent to each other. Behind these slit portions 28 and 30 are provided a lower layer paint port 29 and an upper layer paint port 31, respectively. In this extrusion coater 27, the lower layer paint and the upper layer paint supplied to the paint ports 29 and 31 are extruded through the lower layer paint slit 28 and the upper layer paint slit 30, respectively, to the coater end portion. On the other hand, the non-magnetic support body 11 travels in the direction of D indicated in the figure along the coater tip surface from the lower layer paint slit portion 28 toward the upper layer paint slit portion 30.

The non-magnetic support body 11 thus traveling is coated with the lower non-magnetic paint extruded from the lower paint slit portion 28 and then with the upper magnetic paint extruded from the upper paint slit portion 30 while passing by the lower non-magnetic paint slit portion 28 and the upper magnetic paint slit portion 30, thus simultaneously forming the two paint films 24 and 25.

The magnetic film thus consisting of the lower non-magnetic layer and the upper magnetic layer is then subjected to a vanish processing or blade processing if necessary, so as to be made into a desired medium configuration to obtain a magnetic recording medium.

The medium configuration may be a tape, film, sheet, disc, drum, or the like. It is possible to employ any of the configurations normally used for a magnetic recording medium.

The magnetic recording medium thus produced has a preferable surface of the upper layer and according has a preferable electromagnetic conversion characteristic as well as a preferable RF envelope configuration. Moreover, it is possible to suppress drop out. Furthermore, the fatty acid lubricant added to the lower non-magnetic layer effectively moves to the medium surface and the fatty acid lubricant added to the upper layer will not be pulled to the lower non-magnetic layer, which enable to obtain an excellent running durability. It should be noted that in order to improve the electromagnetic conversion characteristic in a higher recording density area, it is preferable that the upper magnetic layer have a thickness of 0.3 μm or below, and more preferably in the range of 0.1 to 0.3 μm. If the upper magnetic layer has a thickness exceeding 0.3 μm, the electric characteristic is deteriorated. For example if applied to a digital recording method, it cannot serve as a sufficient medium.

This the basic configuration of the magnetic recording medium production procedure. Furthermore, it is possible to provide a back coat layer on the opposite side of the non-magnetic support body not having the upper and the lower layers, or to provide a under coat layer between the lower non-magnetic layer and the non-magnetic support body. The back coat layer and the downward-pulling layer can be formed according to the normal coating method.

[EXAMPLES]

Hereinafter, description will be directed to specific examples according to experiment results.

Magnetic Tape Production

Here, explanation will be given on a production procedure of a magnetic tape produced in Examples and Comparative Examples which will be detailed later.

Firstly, each of the components of the upper layer magnetic paint is measured and kneaded and dispersed by using a continuous two-shaft kneader and a sand mill, so as to prepare an upper layer magnetic paint.

<Upper Layer Magnetic Paint>

Ferromagnetic iron fine powder (having coercive force 2200 Oe; specific surface by BET 50 m$^2$/g; longer axis length 0.1 μm; needle ratio 3; saturation magnetization δs 145 emu/g) . . . 100 weight parts Binder:

vinyl chloride resin containing sulfonic acid potassium salt . . . 20 weight parts α-alumina . . . 5 weight parts Myristic acid . . . 1 weight part Butylstearate . . . 1 weight part Solvent (mixture containing methylethyl ketone, toluene, and at cyclohexanon with a weight ratio of 1:1:1) . . . 350 weight parts Next, each of the components of the lower layer non-magnetic paint is measured and kneaded in a continuous two-shaft kneader.

<Lower Layer Non-magnetic Paint Composition (for Kneading)>

α-Fe$_2$O$_3$ . . . 100 weight parts

Binder:

vinyl chloride copolymer . . . 20 weight parts

Solvent (mixture of methylethyl ketone, toluene, and cyclohexanon with a weight ratio of 1:1:1) . . . 26 weight parts It should be noted that the longer axis length of the non-magnetic powder, the surface pH, and the functional group introduced into the vinyl chloride copolymer are changed in the respective Examples or in the Comparative Examples.

Next, the kneaded mixture obtained is placed in a sand mill, into which are further added 1 weight part of butyl stearate, 1 weight part of myristic acid, 194 weight parts of solvent (consisting of methylethyl ketone, toluene, and cyclohexanon with a weight ratio of 1:1:1) and subjected to dilution and dispersion for 5 hours.

Each of the upper layer magnetic paint and the lower layer non-magnetic paint thus prepared is added by 5 weight parts of polyisocyanate compound. The upper layer magnetic paint and the lower layer non-magnetic paint are applied by the went-on-wet method onto a polyethylene terephthalate support body having a thickness of 7.5 μm, so as to obtain a double-layered coating which is subjected to a magnetic field orientation while not dried, and then dried and subjected to a surface smoothing treatment by a calendar, so as to form a lower non-magnetic layer and an upper magnetic layer. It should be noted that the film configuration (after dried) is such that the lower non-magnetic layer has a thickness of 1.5 μm and the upper magnetic layer has a thickness of 0.15 μm.

Furthermore, on the opposite side of the aforementioned polyethylene terephthalate support body not having the lower non-magnetic layer and the upper magnetic layer, back coat paint having a composition describe below is applied, dried, and subjected to a surface smoothing treatment by a calendar so as to form a back coat layer having a thickness of 0.8 μm, thus obtaining an original magnetic tape material.

<Back Coat Paint Composition>

Carbon black (average particle diameter 26 nm) . . . 40 weight parts

Barium sulfate (average particle diameter 300 nm) . . . 10 weight parts

Nitro cellulose . . . 25 weight parts polyurethane resin . . . 25 weight parts

Polyisocyanate compound . . . 10 weight parts

Solvent (consisting of methylethyl ketone, toluene, and cyclohexanon with a weight ratio of 1:1:1) . . . 9000 weight parts The original magnetic tape material thus obtained cut into a tape width of 8 mm so as to obtain a magnetic tape.

In the Examples and Comparative Examples described below, the magnetic tapes were prepared according to the aforementioned production procedure.

Examination of Binder used in Kneading Process

Magnetic tape samples (Examples 1 to 6 and Comparative Examples 1 to 10) were prepared according to the aforementioned production procedure by using as a binder a vinyl chloride copolymer having a functional group and polymerization degree shown in Table 1 below. The non-magnetic powder used was α-$Fe_2O_3$ (specific surface by the BET method: 52 $m^2$/g; longer axis length: 0.15 μm; and needle ratio: 6) with a surface pH of 5.3.

TABLE 1

| | P* | A* | B* | C* | C* | E* | F* |
|---|---|---|---|---|---|---|---|
| Example 1 | 150 | 85.0 | 0.0 | 1.5 | 0.0 | 0.4 | 2.0 |
| Example 2 | 100 | 85.5 | 0.0 | 1.5 | 0.0 | 0.4 | 2.0 |
| Example 3 | 200 | 85.0 | 0.0 | 1.5 | 0.0 | 0.4 | 2.0 |
| Example 4 | 150 | 85.0 | 1.5 | 0.0 | 0.0 | 0.4 | 2.0 |
| Example 5 | 100 | 85.0 | 1.5 | 0.0 | 0.0 | 0.4 | 2.0 |
| Example 6 | 200 | 85.0 | 1.5 | 0.0 | 0.0 | 0.4 | 2.0 |
| Compar. Ex. 1 | 50 | 85.0 | 0.0 | 1.5 | 0.0 | 0.4 | 2.0 |
| Compar. Ex. 2 | 250 | 85.0 | 0.0 | 1.5 | 0.0 | 0.4 | 2.0 |
| Compar. Ex. 3 | 150 | 85.0 | 0.0 | 0.0 | 0.0 | 0.4 | 2.0 |

TABLE 1-continued

| | P* | A* | B* | C* | C* | E* | F* |
|---|---|---|---|---|---|---|---|
| Compar. Ex. 4 | 150 | 85.0 | 0.0 | 1.5 | 0.0 | 0.0 | 2.0 |
| Compar. Ex. 5 | 150 | 85.0 | 0.0 | 1.5 | 0.0 | 0.4 | 2.0 |
| Compar. Ex. 6 | 50 | 85.0 | 1.5 | 0.0 | 0.0 | 0.4 | 2.0 |
| Compar. Ex. 7 | 250 | 85.0 | 1.5 | 0.0 | 0.0 | 0.4 | 2.0 |
| Compar. Ex. 8 | 150 | 85.0 | 1.5 | 0.0 | 0.0 | 0.0 | 2.0 |
| Compar. Ex. 9 | 150 | 85.0 | 1.5 | 0.0 | 0.0 | 0.4 | 0.0 |
| Compar. Ex. 10 | 150 | 85.0 | 0.0 | 0.0 | 1.5 | 0.4 | 2.0 |

Notes
P* Polymerization degree
A* Vinyl chloride [weight %]
B* Quaternary ammonium base [weight %]
C* Sulfonic acid base [weight %]
D* Carboxylic acid base [weight %]
E* Hydroxy group [weight %]
F* Epoxy group [weight %]

The magnetic tapes prepared were checked in surface state, surface roughness Ra, electromagnetic conversion characteristic, RF envelope, and the number of drop outs. Note that these checks were carried out as follows.

The surface state were checked by using a differential interference microscope. If the surface was found to be sufficiently flat, the surface state was evaluated by a circle; if the surface was found to be slightly rough, it was evaluated by a triangle; and if the surface was found to be pretty rough, it was evaluated by a cross.

The surface roughness Ra (nm) is a center line average roughness Ra defined by the JIS B 0601. This surface roughness Ra was measured by using Talystep roughness meter produced by Taylor-Hobson Co., Ltd. The measurement conditions were set to: stylus of 2.5×0.1 μm; needle pressure of 2 mg; cut off filter of 0.33 Hz; measurement speed of 2.5 μm/s; and the reference length of 0.5 mm. It should be noted that the roughness curve eliminates concave and convex portions of 0.01 μm or above.

The electromagnetic conversion characteristic (RF output) was measured by making the sample tape travel on a data 8 milli drive (trade name EXB-8505XL produced by Exabyte Co., Ltd.), so as to measure an 8.5 MHz output component generated in the magnetic head. The measurement data are recorded as relative values, by setting as 0 dB the value obtained by the sample tape of Comparative Example 8.

The RF envelope was checked by making the sample tape travel on an 8 milli deck (trade name S-550 produced by Sony Co., Ltd.), so as to obtain an RF envelope on an oscilloscope, and the evaluation was made by determining a ratio between the maximum value and the minimum value of the envelope.

The number of drop outs was measured by using a VH01BZ (trade name) apparatus produced by Shibasoku Co., Ltd., so as to determine a number of –12 dB/5 ms output lowering (drop out) detected per minute.

Table 2 shows the results of these measurements.

TABLE 2

| | Surface | Ra [nm] | RF output [dB] | RF envelope [%] | Drop out | Remarks |
|---|---|---|---|---|---|---|
| Example 1 | ◯ | 2.8 | 0.4 | 88 | 3 | |
| Example 2 | ◯ | 2.4 | 0.6 | 86 | 3 | |
| Example 3 | ◯ | 2.9 | 0.5 | 87 | 4 | |
| Example 4 | ◯ | 2.9 | 0.4 | 89 | 3 | |
| Example 5 | ◯ | 2.5 | 0.5 | 88 | 2 | |

TABLE 2-continued

| | Surface | Ra [nm] | RF output [dB] | RF envelope [%] | Drop out | Remarks |
|---|---|---|---|---|---|---|
| Example 6 | ○ | 3.0 | 0.2 | 87 | 5 | |
| Example 7 | ○ | 2.0 | 1.0 | 89 | 2 | |
| Comp. Ex. 1 | ○ | 2.4 | 0.4 | 86 | 14 | |
| Comp. Ex. 2 | X | 6.8 | −2.9 | 76 | 9 | |
| Comp. Ex. 3 | X | 6.5 | −2.7 | 78 | 10 | |
| Comp. Ex. 4 | ○ | 2.6 | 0.3 | 84 | 16 | |
| Comp. Ex. 5 | ○ | 2.4 | 0.7 | 88 | 2 | Note 1 |
| Comp. Ex. 6 | ○ | 2.2 | 0.7 | 89 | 18 | |
| Comp. Ex. 7 | X | 5.9 | −2.2 | 74 | 11 | |
| Comp. Ex. 8 | Δ | 3.6 | 0 | 82 | 18 | |
| Comp. Ex. 9 | ○ | 2.3 | 0.6 | 87 | 3 | Note 1 |
| Comp. Ex. 10 | X | 6.2 | −2.4 | 75 | 9 | |

Note:
Hydrochloric acid generated when burnt

As shown in Table 2, magnetic tapes of Examples 1 to 6 prepared by using a vinyl chloride copolymer containing a sulfonic acid base and/or quaternary ammonium base and hydroxyl and epoxy group, and having an average polymerization degree of 100 to 220 were found to have preferable surface states as well as preferable electromagnetic characteristic and preferable RF envelope, enabling to sufficiently suppress the drop out.

On the contrary, the magnetic tapes of Comparative Examples 1, 2, 6, and 7 prepared by using a vinyl chloride having a polymerization degree out of the predetermined range; and the magnetic tapes of Comparative Examples 3, 4, and 8 prepared by using a vinyl chloride not containing one of a sulfonic acid base, a quaternary ammonium base, and hydroxyl group were found to have a rough surface and disabled to have a sufficient paint strength, which in turn disables to obtain a sufficient electromagnetic conversion characteristic or causes a frequent trop out. The RV envelope had a defective configuration. Moreover, the magnetic tapes of Comparative Examples 5 and 9 prepared by using a vinyl chloride copolymer not having an epoxy group were found to be at a level for practical use but these tapes caused to generate hydrochloric acid when burnt. This hydrochloric acid comes from the vinyl chloride copolymer and there arises a danger of corrosion of the magnetic film because of dechlorination of the vinyl chloride copolymer. Furthermore, no preferable characteristics were obtained in the Comparative Example 10 prepared by using a vinyl chloride copolymer having a hydroxyl group, epoxy group, and a carboxyl group as an aqueous group.

From the aforementioned, it was found that the binder used in the kneading process preferably is a vinyl chloride copolymer having a sulfonic acid base and/or quaternary ammonium base and hydroxyl group and epoxy group, with an average polymerization degree of 100 to 220.

It should be noted that Table 2 also shows measurement results of a sample tape (Example 7) having the lower layer and the upper layer, both of which contain the binder used in the lower non-magnetic layer of Example 4. As shown in Table 2, this sample tape of Example 7 exhibited preferable characteristics compared to the sample tape of Example 4. This shows that the medium characteristics are further improved by the use of the vinyl chloride copolymer having a sulfonic acid base and/or quaternary ammonium base and hydroxyl and epoxy group, with an average polymerization degree of 100 to 220, for both of the lower non-magnetic layer and the upper magnetic layer.

Examination of Non-magnetic Powder Longer Axis Length

Table 3 shows the longer axis length values of the α-Fe$_2$O$_3$ which were used as the non-magnetic powder of the non-magnetic paint to prepare magnetic tapes. It should be noted that the surface pH of the α-Fe$_2$O$_3$ was 5.3. Moreover, the binder used was a vinyl chloride copolymer (with polymerization degree of 150, containing 85 weight % of vinyl chloride, 1.5 weight % of sulfonic acid base, 0.4 weight % of hydroxy group, and 2.0 weight % of epoxy group).

The magnetic tapes prepared were checked in the surface state, surface roughness Ra, electromagnetic conversion characteristic, the RF envelope, and the number of drop outs.

The measurement results are shown in Table 3.

TABLE 3

| | Longer axis length [μm] | Surface state | Ra [nm] | RF output [dB] | RF envelope [%] | Drop out [pcs/min] |
|---|---|---|---|---|---|---|
| Example 8 | 0.15 | ○ | 3.1 | 0.5 | 86 | 3 |
| Example 9 | 0.12 | ○ | 2.9 | 0.8 | 84 | 2 |
| Example 10 | 0.11 | ○ | 2.8 | 0.7 | 89 | 2 |
| Example 11 | 0.25 | X | 5.1 | −2.1 | 78 | 12 |

As shown in Table 3, the magnetic tapes of Examples 8 to 10 prepared by using a non-magnetic powder having a longer axis length of 0.2 μm or below for the lower non-magnetic paint had preferable surface characteristics, preferable electromagnetic conversion characteristics, and preferable RF envelope while sufficiently suppressing the drop out.

In contrast to this, the magnetic tape of Comparative Example 11 prepared by using a non-magnetic powder having a longer axis length above 0.2 μm for the lower non-magnetic paint was found to have a defective surface of the upper magnetic layer, disabling to obtain a sufficient electromagnetic conversion characteristic, and causing a frequent drop out. The RF envelope configuration was not preferable.

From the aforementioned, we found that the use of a non-magnetic powder having a longer axis length of 0.2 mm or below for the lower non-magnetic paint is effective to obtain a magnetic recording medium of double coating type having preferable characteristics.

Examination of the Non-magnetic Powder Surface pH

Table 4 shows the surface pH and the longer axis length values of the α-Fe$_2$O$_3$ used as a non-magnetic powder for producing magnetic tapes according to the aforementioned production procedure. Note that as the binder used bas a vinyl chloride copolymer (with polymerization degree of 150, consisting of 85 weight % of vinyl chloride, 1.5 weight % of sulfonic acid base, 0.4 weight % of hydroxy group, and 2.0 weight % of epoxy group).

The magnetic tapes prepared were checked in the running durability and the number of drop outs. It should be noted that the running durability was determined as follows.

The running durability was determined by making the sample tape travel 1000 times on a data 8 milli drive, so as to measure an output lowering. The measurements were made in relative values assuming 0 dB the sample tape output immediately after the running start.

Table 4 shows results of the measurements.

TABLE 4

|  | Longer axis length [mm] | Surface pH | Running durability | Drop out [pcs/min] |
| --- | --- | --- | --- | --- |
| Example 11 | 0.15 | 5.8 | −1.0 | 3 |
| Example 12 | 0.12 | 5.9 | −1.0 | 2 |
| Example 13 | 0.11 | 6.3 | −1.2 | 2 |
| Comp. Ex. 12 | 0.15 | 9.4 | −4.5 | 8 |
| Comp. Ex. 13 | 0.14 | 8.5 | −3.8 | 12 |
| Comp. Ex. 14 | 0.11 | 9.4 | −5.0 | 10 |

As shown in FIG. 4, the magnetic tapes of Examples 11 to 13 prepared by using the non-magnetic powder having a surface pH below 7 for the lower non-magnetic layer exhibited a preferable running durability, sufficiently suppressing the drop out.

In contrast to this, the magnetic tapes of Comparative Examples 12 to 14 prepared by using a non-magnetic powder having surface pH of 7 or above for the lower non-magnetic paint exhibited insufficient running durability, causing a frequent drop out. The reasons is considered to be that the fatty acid lubricant added to the paint was not supplied sufficiently to the tape surface.

From the aforementioned, it was found that in order to maintain a preferable lubrication on the upper magnetic layer surface to improve the tape running durability, the non-magnetic powder used for the lower non-magnetic layer should have a surface pH below 7.

As is clear from the aforementioned, in the double-coating type magnetic recording medium according to the present invention, the non-magnetic powder contained in the lower non-magnetic layer paint has a longer axis length and a surface pH which are regulated to predetermined values; and the binder used for the lower non-magnetic layer paint is a vinyl chloride having a sulfonic acid base and/or quaternary ammonium base and hydroxy group and epoxy group, with a polymerization degree of 100 to 220, and accordingly, it is possible to obtain a lower non-magnetic layer and an upper magnetic layer having a flat and smooth surface and a preferable electromagnetic conversion characteristic. Moreover, the upper magnetic layer surface can have a preferable lubrication for a long time, enabling to obtain an excellent running durability.

What is claimed is:

1. A magnetic recording medium comprising a lower non-magnetic layer comprising a non-magnetic powder, a binder, a lubricant, and a hardening agent and an upper magnetic layer consisting essentially of a magnetic powder and a binder which layers are formed on a non-magnetic support body, wherein said binder of the lower non-magnetic layer is a vinyl chloride copolymer having a sulfonic acid base and/or a quaternary ammonium base and hydroxy group and epoxy group, and having an average polymerization degree ranging from about 100 to about 220, and said non-magnetic powder having a longer axis length of 0.2 $\mu$m or below, an acid surface, an axis ratio ranging from about 2 to about 20 and a specific surface area ranging from greater than about 100 to about 250 m$^2$/g.

2. A magnetic recording medium as claimed in claim 1, wherein said lubricant is selected from the group consisting of a fatty acid, a fatty ester acid, and combinations thereof, said fatty acid comprises a number of carbon atoms ranging from about 6 to about 30.

3. A magnetic recording medium as claimed in claim 1 wherein said hardening agent comprises polyisocyanates having an average molecule weight ranging from about 100 to about 3000.

4. A magnetic recording medium production method for forming a lower non-magnetic layer by coating a non-magnetic support body with a lower layer non-magnetic paint comprising a non-magnetic powder and a binder dispersed in a solvent, and coating said lower non-magnetic layer with an upper magnetic layer formed by applying an upper layer magnetic paint containing a magnetic powder and a binder dispersed in a solvent, wherein said lower layer non-magnetic paint is prepared by kneading a non-magnetic powder having a longer axis length of 0.2 $\mu$m, an acid surface and a specific surface area ranging from greater than about 100 to about 200 m$^2$/g together with a vinyl chloride copolymer having a sulfonic acid base and/or quaternary ammonium base and hydroxy group and epoxy group, with an average polymerization degree ranging from about 100 to about 220 as well as a solvent, after which kneading a solvent is added to the mixture obtained, so as to be diluted and dispersed.

* * * * *